United States Patent [19]

Schaff, Jr.

[11] 4,444,054

[45] Apr. 24, 1984

[54] TEMPERATURE COMPENSATION FOR DIFFUSED SEMICONDUCTOR STRAIN DEVICES

[75] Inventor: Alfred Schaff, Jr., Marina Del Rey, Calif.

[73] Assignee: Ametek, Inc., New York, N.Y.

[21] Appl. No.: 412,959

[22] Filed: Aug. 30, 1982

[51] Int. Cl.$^3$ .......................................... G01L 19/04
[52] U.S. Cl. ...................................... 73/708; 73/721; 338/7; 357/26
[58] Field of Search ................. 73/708, 721, 766, 765, 73/DIG. 4; 357/26; 338/7

[56] References Cited

U.S. PATENT DOCUMENTS

| | | | |
|---|---|---|---|
| 3,537,319 | 11/1970 | Yerman | 73/708 |
| 3,800,264 | 3/1974 | Kurtz et al. | 73/708 |
| 3,836,796 | 9/1974 | Solomon et al. | 73/708 |
| 4,125,820 | 11/1978 | Marshall | 357/26 |
| 4,164,668 | 8/1979 | Delaporte et al. | 307/303 |
| 4,191,057 | 3/1980 | Busta | 357/26 |
| 4,205,556 | 6/1980 | Runyan | 73/727 |
| 4,300,395 | 11/1981 | Shirouzu et al. | 338/7 |

Primary Examiner—Donald O. Woodiel

[57] ABSTRACT

A system for extending the temperature range over which diffused semiconductor strain sensing devices specifically can be used includes a semiconductor chip having a base material and a semiconductor device formed in the base material. Biasing potential is applied to the base material and excitation potential applied to the diffused device. The biasing potential and the excitation potential are selected relative to one another to permit a predetermined variation in the semiconductor device characteristic with temperature over an extended temperature range. In the semiconductor strain sensing application, this predetermined characteristic is the impedance of the device. In this way, compensation for the variation of the characteristic can be applied to extend the useful temperature range for the semiconductor device. In particular, the design considerations to achieve the relative biasing uniquely provide the relative potentials in a simple manner, providing for low cost devices with the desired extended temperature range.

17 Claims, 5 Drawing Figures

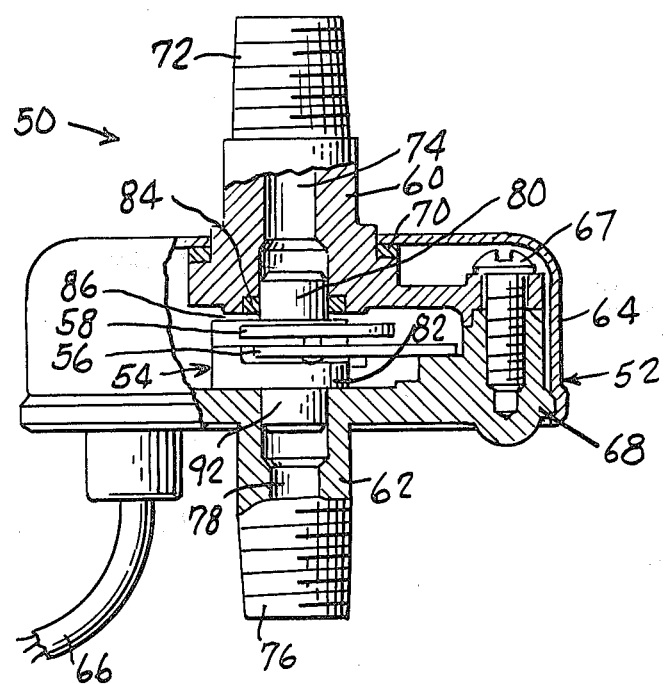

TEMPERATURE COMPENSATION FOR DIFFUSED SEMICONDUCTOR STRAIN DEVICES

The invention relates to diffused semiconductor strain devices and to related systems for extending the temperature range over which such devices can be effectively used. In particular, the invention relates to semiconductor strain sensing devices or transducers for measurement of absolute, gauge (relative) or differential pressure of fluid media at elevated temperatures.

Semiconductor devices such as diodes, transistors and the like have long been known in the art. Generally, these devices are useful at relatively low temperatures. At elevated temperatures, the characteristics of these devices change, often in such a way as to make temperature compensation difficult to achieve. Semiconductor strain sensing devices, such as pressure transducers, have also been long known in the art. Their acceptance and usefulness in pressure sensing application has also been limited to relatively low temperature applications because these devices exhibit non-linear impedence variations at elevated temperatures. As a result, these devices have not found use in applications where the fluid or environmental temperature exceeds about 150° C. Above this temperature, the strain gauge resistors, and the resistorgauge sensitivity to strain, change in such a manner as to practically preclude effective temperature compensation. Thus, these semiconductor strain sensing devices are not usable at temperatures in the range of, for example, +150° C. to +250° C. where many of the pressure measurements are needed, such as in automotive, truck, aircraft, power plant and deep well applications.

There have been various attempts to provide temperature compensation for semiconductor strain sensors. For example, in U.S. Pat. No. 4,125,820 entitled "Stress Sensor Apparatus" issued to James F. Marshall, temperature compensation is effected by control of the resistor dopant. In U.S. Pat. No. 3,836,796 entitled "Semiconductor Pressure Transducer Employing Novel Temperature Compensation Means" issued to James E. Solomon et al, a temperature compensation circuit is disclosed which comprises a plurality of series connected PN junction diodes formed in the N epitaxial layer of the silicon chips. U.S. Pat. No. 3,537,319 entitled "Silicon Diaphragm With Optimized Integral Strain Gauges" issued to A. J. Yerman describes the use of series resistant strips connected to contact pads which terminate in other contact pairs and which are both oriented in the 001 crystallographic direction. These and other systems for temperature compensation involve the precise forming of the semiconductor materials to overcome the problems of variations in the device characteristics as the temperature of the operating environment increases and are thus difficult and relatively expensive to achieve.

It is an object of this invention to overcome the limitations and problems associated with extending the useful temperature range of semiconductor devices. It is a more specific object of the invention to provide a system for extending the useful temperature range of semiconductor strain gauge devices, and/or devices based on diffused resistors.

Still further, it is an object of the invention to extend the useful temperature range of semiconductor pressure sensing devices. A particular object of the invention is to extend the range of linear or near-linear variation of the impedance of a semiconductor sensing device with temperature so that simple and/or inexpensive temperature compensation can be applied to extend the usable temperature range of the pressure sensing device. The invention has been found, for example, to increase the useful range of use of semiconductor pressure sensing devices to at least 250° C.

These and other objects of the invention are achieved by providing an electrical charge or bias to the matrix silicon base material relative to the semiconductor device. In one particular embodiment of the invention, a semiconductor device includes a base material and an electrical device formed in the base material. Biasing potential is applied to the base material and excitation potential applied to the electrical device formed in the base material. The biasing potential and the excitation potential are selected relative to one another to permit a predetermined variation of a characteristic of the semiconductor device with temperature over an extended temperature range. In this way, compensation for the variation of the characteristic of the semiconductor device with temperature can be applied to extend the useful temperature range of the semiconductor device. In a particular form of the invention, monocrystalline matrix silicon forms the base material and the electrical device is formed into the monocrystalline matrix silicon by, for example, diffusion or ion implementation.

In accordance with another more particular aspect of the invention, a device for sensing the condition of a pressurized fluid includes a housing and a semiconductor chip having a base material and semiconductor strain sensing elements formed in the base material positioned in the housing for sensing fluid pressure. The base material is provided with a biasing potential and the strain sensing elements are provided with excitation potential. The biasing potential and excitation potential are selected relative to each other to permit a predetermined variation of a characteristic of the semiconductor device with temperature over an extended temperature range, thereby permitting temperature compensation to be applied to extend the useful temperature range of the semiconductor device. In a particular aspect of the invention, the characteristic of the sensing device is the impedance and the selection of the relative excitation and biasing potentials extends the range of linear variation of the impedance of the semiconductor device with temperature. It has been found that the minimum difference between the excitation potential and biasing potential should be at least 0.3 volts. It has also been found that the difference between the excitation potential and biasing potential should be less than the sensing element avalanche breakdown voltage.

More specifically, in accordance with the invention, a monocrystalline silicon chip forming the matrix silicon base material has a diaphragm portion with integral semiconductor strain sensing elements arranged in a Wheatstone Bridge circuit for sensing the strain in the silicon diaphragm caused by the fluid pressure. Remote terminals are provided for interconnection between the integral semiconductor strain sensing elements and circuitry external to the chip and a direct electrical connection to the matrix silicon base material for controlling the characteristics of the device, such that high temperatures do not degrade the sensor performance. The effects of temperature are countermanded by the application of a charge on the matrix silicon base material higher than the voltage applied to any portion of the sensing elements. The amount of this charge should be within limits to be effective so as to not over-correct the temperature effects and render the chip useless. Thus, the design of the strain gauge bridge with its interconnections and the location and amount of biasing determine the extent to which the useable temperature can be raised. In one particular aspect of the invention, the sensing elements are excited through an integral conductor resistor which insures that the bridge excitation is always lower than the voltage-charge which is applied to the silicon matrix. The chips may, in turn, be assembled into metal or plastic cartridges or housing for attachment to sources of fluid for which the absolute, gauge or differential pressure is to be measured.

These and other objects and features of the invention will become more apparent from the following detailed description of the invention taken in conjunction with the drawings, in which.

Figure 4:
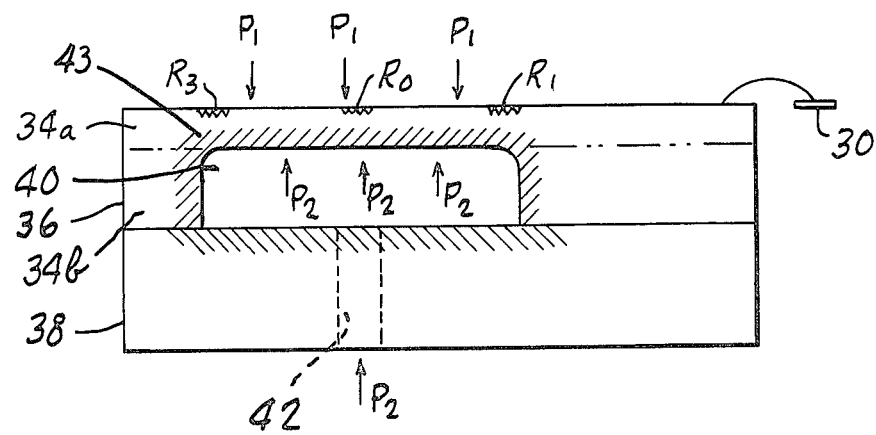

FIG. 4 is a diagrammatic illustration of a semiconductor pressure transducer for measuring relative pressure; and FIG. 5 is an elevational view of the pressure sensing apparatus of the present invention showing the housing assembly in partial cutaway, the cartridge assembly with the partially enclosed pressure sensor chip, and the external temperature compensating and signal conditioning circuit boards.

While the invention can be used to provide temperature compensation for many semiconductor devices, the description which follows will show the invention as applied to semiconductor pressure transducers. This description should be not taken as limiting the invention or its application.

Figure 1:
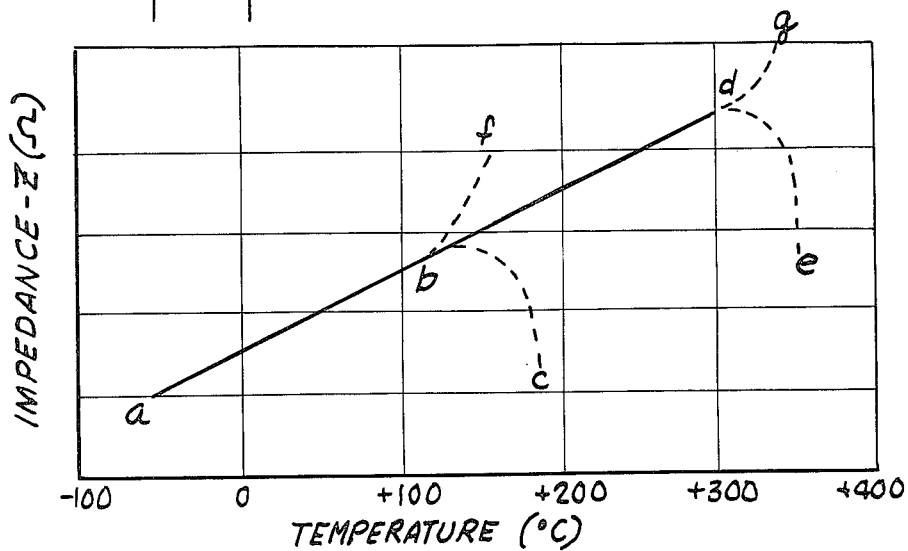
FIG. 1 is a graphical representation of the variation of the characteristic impedance of a semiconductor pressure chip with temperature.

Referring first to FIG. 1, there is graphically depicted the effective characteristic of the pressure sensitive chip with respect to temperature. As shown, the electrical impedance increases with temperature linearly, or near linearly, until a degenerative change occurs. This linear—or near linear characteristic permits a predictable means of compensating the chip for this change of impedance with temperature. In particular, this simple linear characteristic allows for an equally simple and practical external resistor network to accomplish the temperature compensation, as is well known in the art. The region, a to b, is the currently normal performance range of the semiconductor transducer. Above approximately +125° C. the resistance changes abruptly with temperature, b to c, and in a non-predictable or repeatable manner. Temperature compensation thus becomes practically impossible.

Application of a back biasing potential to the matrix silicon in accordance with the invention allows the linear relation of impedance with temperature to continue to a higher temperature, e.g., point d, above 300° C. The extent to which this linearity continues before degredation, d to e, is controlled by the amount of charge application to the matrix silicon relative to the bridge excitation voltage. It has been found that a minimum difference of approximately 0.3 to 0.5 V is required to obtain any extension of the linear region. Charge differences near or in excess of the junction avalanche voltage between the matrix silicon and the diffused strain sensing elements cause breakdowns, f or g, and again preclude practical temperature compensation.

Figure 2:
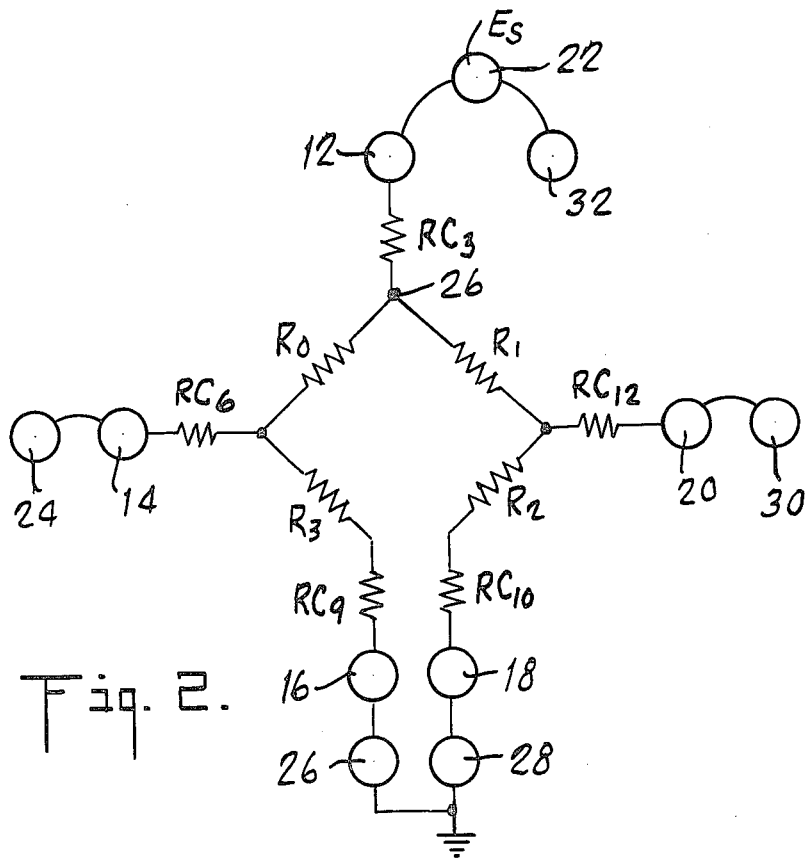
FIG. 2 is a schematic representation of diffused strain sensing elements of a semiconductor pressure transducer indicating also the external connections.

Referring to FIG. 2, the strain sensing elements of a pressure transducer, $R_0$, $R_1$, $R_2$ and $R_3$ are arranged in a Wheatstone Bridge. Resistors $RC_3$, $RC_6$, $RC_9$, $RC_{10}$ and $RC_{12}$ couple the strain sensing elements to ohmic bonding pads 12, 14, 16, 18 and 20 respectively. The ohmic bonding pads are in turn connected to output circuit pads 22, 24, 26, 28 and 30 respectively. The charge is applied to the matrix silicon base material at bonding pad 32. External positive excitation voltage, $E_s$, is applied at external connection 22. The output of the Wheatstone Bridge indicating fluid pressure is taken at output circuit pads 24 and 30. Resistor $RC_3$ is specifically designed so that the bridge circuit is always excited at a voltage below the charge applied to the matrix silicon, since this resistor $RC_3$ acts as a dropping resistor, ensuring that the effective bridge excitation at point 26 is less than the supply voltage $E_s$ which is applied directly to the matrix silicon at bonding pad 32. The direct metal wire bond to the matrix silicon connection 32 ensures that the full excitation $E_s$ is applied to the matrix silicon. Typically, the excitation voltage $E_s$ is in the range of +4 to +40 volts, whereas the design of the resistor $RC_3$ ensures that the bridge excitation is always below that of the matrix silicon.

Figure 3:
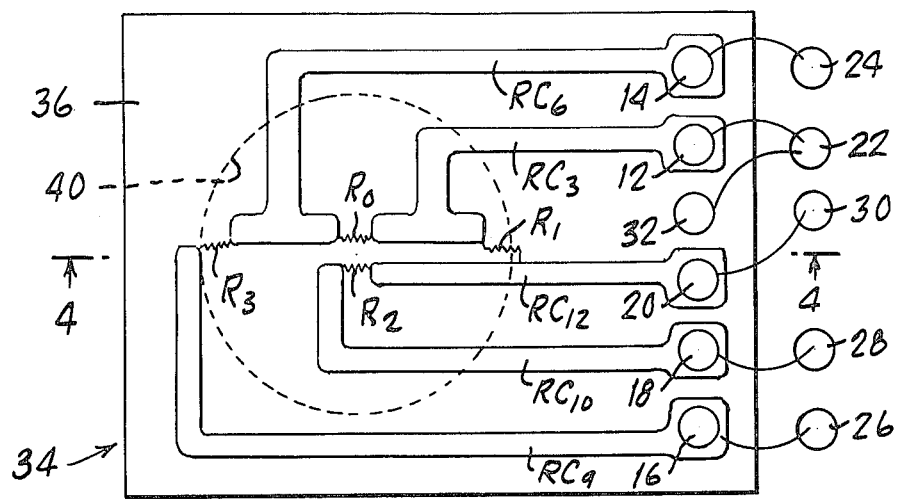
FIG. 3 is a plan view showing the silicon matrix base material and the electrical elements formed by the matrix material.

FIGS. 3 and 4 are plan and section view of the silicon chip 34 consisting of the matrix silicon base material 36, having the strain resistors $R_0$, $R_1$, $R_2$, $R_3$, conductors $RC_3$, $RC_6$, $RC_{12}$, $RC_9$, $RC_{10}$, and the ohmic bonding pads 12, 14, 16, 18, 20 and 32 formed into the matrix silicon base material 36 by well known techniques. The base material may be either bulk material or layered, such as epitaxically applied and, in particular, may be monocrystalline silicon. The strain sensing elements, strain resistors, conductors and ohmic bonding pads may be formed in the base material by, for example, diffusion or ion implementation and alloyed metalization. The sensitized chip 34 is bonded by a cement, glass or other means to a restraining wafer 38, for structural stability. The restraining wafer 38 may be solid to entrap a vacuum within the sensing chip cavity 40, as an absolute reference, or it may have air or gas entrapped as another reference, or there may be a vent hole 42 for using the ambient pressure as a reference to indicate gauge pressure. The cavity 40 is provided to define the pressure sensitive diaphragm 43. This cavity may be circular, square, rectangular or any shape to obtain the desired strain at the diffused strain sensing element $R_0$, $R_1$, $R_2$, $R_3$. Further, the cavity and the diaphragm may be formed by etching away the silicon matrix, or by a composite structure consisting of the desired thickness sensitized wafer 34a attached to a perforated chip 34b. Electrical connections to external circuitry are by means of wire bonds to respective circuit pads 12, 16, 18, 20, and 32.

It is presently understood that the mechanism by which the diffused resistors are controlled relates to the effective average carrier concentration of the diffused strain resistor(s) and the isolation of the Fermi level. The matrix silicon 36 contains the diffused components which form a junction according to the diffusion depth and dopant concentration. The component, for example, a strain resistor, actually consists of a contiguous series of carrier concentrations varying from a maximum at or near the deposition surface where most of the current will flow to less concentrated areas until the junction is formed. Thus, the diffused component resistance varies from a high value near the junction to a low value at or near the deposition surface. The Fermi level of the doped area will remain intact so long as the temperature remains below the intrinsic level. At the intrinsic level, the conductivity drops to low values according to the net impurity. Lower concentrations become intrinsic at lower temperatures. Therefore, the net resistance of the contiguous series of decreasing concentrated layers of the diffused component will tend to drop as the temperature rises through the corresponding intrinsic temperatures. However, if the junction is back biased below the avalanche breakdown point, the Fermi level will change, resulting in a higher average diffused resistor carrier concentration. This higher average concentration will have a higher temperature at which it becomes intrinsic, or the strain resistors and bridge circuit will maintain its characteristics to higher temperature before degrading. Specifically, most diffused strain resistors are formed with average carrier concentrations in the order of $10^{14}$ cm$^{-3}$ to $10^{15}$ cm$^{-3}$. Degradation occurs near 500° K. (150° C.) if left unbiased. Applying a charge to the matrix silicon raises the average concentration to $10^{16}$ cm$^{-3}$ or $10^{17}$ cm$^{-3}$, which raises the conversion to intrinsic temperature above the 500° K. point. The amount of bias charge must be controlled to obtain the Fermi level corresponding to an effective resistor, but not so large as to break down the resistor completely. This balance is obtained by: (1) inserting a dropping resistor RC$_3$ ahead of the diffused bridge circuit to ensure more charge on the matrix than the diffused bridge; and (2) maintaining the voltage below the avalanche breakdown of the diffused junction. It is special to this invention that the control of the back biasing is accomplished via the dropping resistor RC$_3$ which involves the amounts of based and diffused resistor doping, the diffused doping depths, the orientation plane of the diffused geometry, the diffused circuitry itself, and the orientation of the geometry relative to the base silicon crystal orientation.

FIG. 5 shows a complete pressure sensing apparatus 50 including a housing assembly 52, a cartridge assembly 54, a temperature compensator circuit board 56 and a signal conditioning circuit board 58 is shown. The housing assembly 52 includes an inlet pressure hub 60, an outlet pressure hub 62, a protective cover 64 and an output cable 66. The inlet pressure hub 60 is fastened to the outlet pressure hub 62 by three screws 67, only one of which is shown. The protective cover 64 is securely held in position over the outlet pressure hub 60 by crimping over a flange 68 integral with the outlet pressure hub 62. A gasket 70 forms a seal between the protective cover 64 and the inlet pressure hub 60.

The inlet pressure hub 60 is provided with an externally screw threaded coupling portion 72 and a pressure fluid inlet port 74. An analogous externally threaded coupling portion 76 and a pressure fluid inlet port 78 are provided for the outlet pressure hub 62. The threaded coupling portions 72 and 76 readily permit connection of the pressure sensing apparatus 50 to sources of pressurized fluid.

The inlet pressure coupling portion 80 of the cartridge cap assembly 54 snugly fits within the inlet of the inlet pressure hub 60, while outlet pressure coupling portion 92 of the cartridge assembly 54 fits snugly within the low pressure fluid inlet port 78 of the outlet pressure hub 62. An O-ring 84 is provided between the inlet pressure hub 60 and the cartridge cap assembly 54 which acts both as a fluid seal and as a flexible spacer to maintain a suitable gap 86, for preventing stress on the cartridge assembly 54 by thermal expansion and contraction of the housing assembly 52. Thus, a continuous sealed path is provided through the inlet pressure fluid inlet port 74 of the inlet pressure hub 60 and the inlet pressure fluid inlet port of the cartridge assembly 54 for impingement of pressure fluid on one pressure surface P1 (FIG. 4) of the diaphragm portion 42 of the pressure sensor chip 34.

A similar continuous sealed path is provided through the outlet pressure fluid outlet port 78 of the outlet pressure hub 66 and the pressure fluid outlet port of the cartridge assembly 54 for impingement of pressure fluid on the opposite pressure surface P2 (FIG. 4) of the diaphragm portion 43 of the pressure sensor chip 34.

The interchanging of inlet and outlet ports does not affect the functioning of the sensor except to reverse the polarity of the electrical output betweed pads 14 and 20.

It should be understood that the embodiment described herein is only illustrative of the present invention. It should be recognized by those skilled in the art that, for example, the invention may also be practiced with other semiconductor devices, other conventional bridge circuits or with a temperature or sound sensing chips and either p or n type base shown. Accordingly, a latitude of modification, change, and substitution is intended in the foregoing disclosure. Accordingly, it is appropriate that the appended claims be construed broadly and in a manner consistent with the spirit and scope of the invention.

What is claimed is:

1. A semiconductor device responsive to an externally applied stimulus to provide a characteristic electrical output signal comprising:
   a base material;
   an electrical device formed in said base material;
   means for providing a biasing potential to said base material;
   means for providing excitation potential to said electrical device;
   said biasing potential and said excitation potential being selected relative to each other to permit a predetermined variation of a characteristic of said semiconductor device with temperature over an extended temperature range whereby compensation for the variation of the characteristic of said semiconductor device with temperature can be applied to extend the useful temperature range of said semiconductor device.

2. A semiconductor device responsive to an externally applied stimulus to provide a characteristic electrical output signal comprising:
   a monocrystalline silicon chip forming the matrix silicon base material of said semiconductor device;
   an electrical device formed in said matrix silicon;
   means for biasing said matrix silicon with a predetermined biasing potential;
   means for providing excitation potential to said electrical device, said biasing potential and said excitation potential being selected relative to each other to permit a predetermined variation of a characteristic of said semiconductor device with temperature over an extended temperature range whereby compensation for the variation of the characteristic of said semiconductor device with temperature can be applied to extend the useful temperature range of said semiconductor device.

3. The semiconductor device of claim 2, wherein said biasing potential is greater than said excitation potential, by virtue of: (1) the design of the location of the biasing voltage relative to the strain sensing circuitry; and (2) the design of the dropping resistor between the excitation voltage and the strain sensing circuitry.

4. A device for sensing the condition of a pressurized fluid, comprising:
   a housing;
   a semiconductor chip positioned in said housing including a base material and semiconductor strain sensing elements formed in said base material for sensing a condition of said pressurized fluid;
   means for providing a biasing potential to said base material;
   means coupled to said strain sensing elements for providing excitation potential thereto;
   means coupled to said strain sensing elements for responding to the electrical signal produced by said strain sensing elements in response to the condition of the pressurized fluid;
   said biasing potential and said excitation potential being selected relative to each other to permit a predetermined variation of a characteristic of said semiconductor device with temperature over an extended temperature range whereby compensation for the variation of the characteristic of said semiconductor device with temperature can be applied to extend the useful temperature range of said semiconductor device.

5. The device of claim 4, wherein said strain sensing elements are arranged in a Wheatstone Bridge.

6. The device of claim 5, wherein said predetermined characteristic of said semiconductor device is the impedance of said device and the selection of the relative excitation and biasing potentials extends the range of linear variation of the impedance of the semiconductor device with temperature.

7. The device of claim 6, wherein the range of linear variation of impedance with temperature is extended to at least 250° C.

8. The device of claim 4, wherein the sensed condition of the pressurized fluid is the absolute pressure of the fluid.

9. The device of claim 4, wherein the sensed condition of the pressurized fluid is the gauge pressure of the pressurized fluid.

10. A device for sensing the condition of a pressurized fluid comprising:
    a housing;
    a monocrystalline silicon chip forming the matrix silicon base material of said semiconductor device positioned in the housing;
    semiconductor strain sensing elements formed in a Wheatstone Bridge in said matrix silicon;
    means for biasing said matrix silicon with a predetermined biasing potential;
    means coupled to said strain sensing elements for providing excitation potential thereto;
    means coupled to said strain sensing elements for providing an output signal indicative of a condition of the pressurized fluid;
    said biasing potential being greater than said excitation potential by a predetermined amount to extend the range of linear variation of the impedance of the semiconductor device with temperature whereby compensation for the variation of impedance of the device with temperature can be applied to extend the useful temperature range of said device.

11. The device of claim 10, wherein the difference between the excitation potential and the biasing potential is at least 0.3 volts.

12. The device of claim 10, wherein the difference between the excitation potential and the biasing potential is less than the sensing element avalanche breakdown voltage.

13. A method for extending the useful temperature range of a semiconductor device which includes a semiconductor chip having a base material and an electrical device formed in said base material comprising the steps of:
    providing a biasing potential to said base material;
    providing excitation potential to said electrical device; and
    selecting said biasing potential and said excitation potential relative to each other to permit a predetermined variation of a characteristic of said semiconductor device with temperature over an extended temperature range whereby compensation for the variation of the characteristic of said semiconductor device with temperature can be applied to extend the useful temperature range of said semiconductor device.

14. A method for extending the useful temperature range of a pressure transducer which includes a monocrystalline silicon chip forming the matrix silicon base material of said semiconductor device and semiconductor strain sensing elements formed in a Wheatstone Bridge in said matrix silicon, comprising the steps of:
    providing a biasing potential to said matrix silicon;
    providing excitation potential to said electrical device; and
    selecting said biasing potential and said excitation potential relative to each other to permit a predetermined variation of a characteristic of said semiconductor device with temperature over an extended temperature range whereby compensation for the variation of the characteristic of said semiconductor device with temperature can be applied to extend the useful temperature range of said semiconductor device.

15. A semiconductor device adapted to be responsive to an externally applied stimulus to provide a characteristic electrical output signal comprising:
    a monocrystalline silicon chip forming the matrix silicon base material of the semiconductor device;
    an electrical device diffused in said matrix silicon;
    said silicon chip being adapted for connection to a biasing potential and said electrical device being adapted for connection to an excitation potential, said biasing potential and said excitation potential being selected relative to each other to permit a predetermined variation of a characteristic of said semiconductor device with temperature over an extended temperature range whereby compensation for the variation of the characteristic of said semiconductor device with temperature can be applied to extend the useful temperature range of said semiconductor device.

16. A device for sensing the condition of a pressurized fluid comprising:
    a housing;

a monocrystalline silicon chip forming the matrix silicon base material of said semiconductor device positioned in said housing;
semiconductor strain sensing elements formed in a Wheatstone Bridge in said matrix silicon;
said matrix silicon adapted to be provided with a predetermined biasing potential and said electrical device adapted to be provided with a predetermined excitation potential, said biasing potential and said excitation potential being selected relative to each other to permit the impedance of said device to vary linearly with temperature over an extended temperature range so that compensation for the variation of said impedance with temperature can be applied to extend the useful temperature range of said semiconductor device.

17. The device of claim 16 further including a restraining wafer, said sensitized chip being bonded to said restraining wafer, a cavity formed between said semiconductor chip and said restraining wafer defining a pressure sensitive diaphragm proximate said strain sensing elements to provide a site for sensing the condition of the pressurized fluid.

* * * * *